Dec. 2, 1941.  F. M. OWEN  2,264,480
GRIPPING DEVICE
Filed Feb. 28, 1938   3 Sheets-Sheet 1
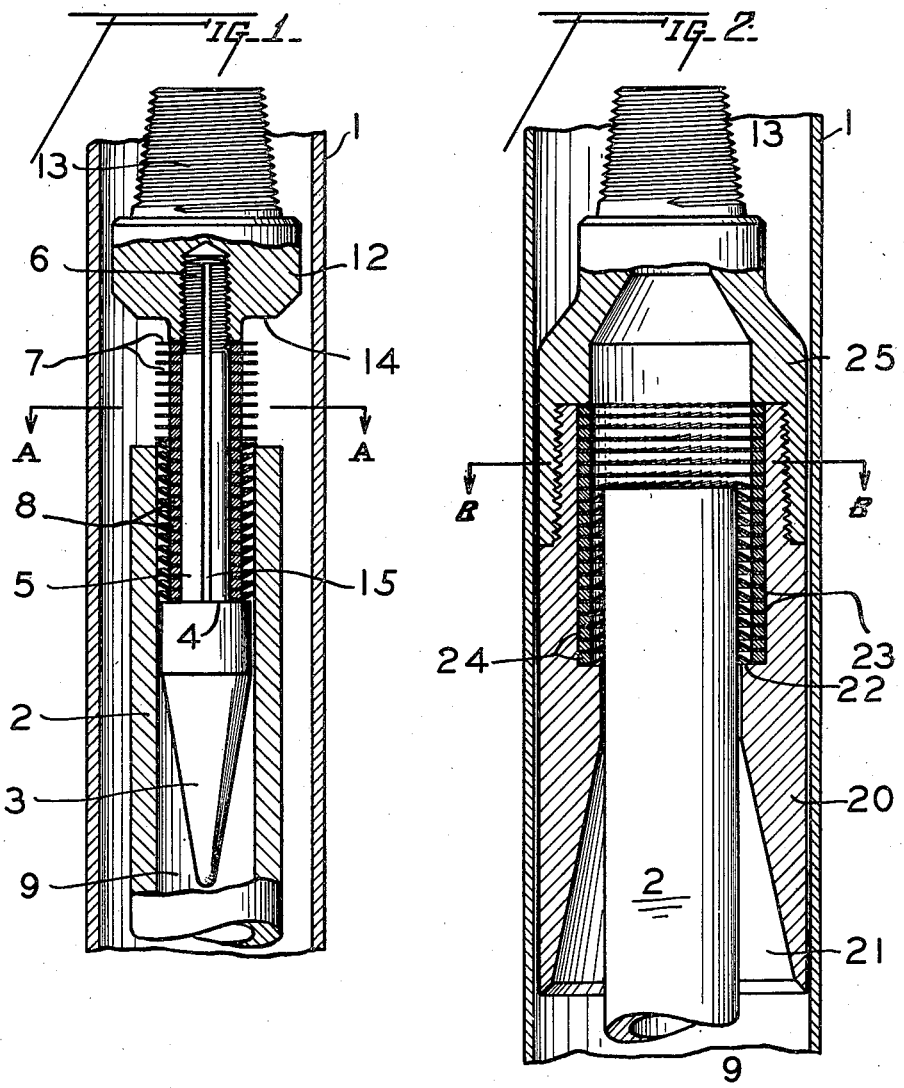
Frank M. Owen
INVENTOR
BY Bernard P. Miller
ATTORNEY Dec. 2, 1941.  F. M. OWEN  2,264,480
GRIPPING DEVICE
Filed Feb. 28, 1938  3 Sheets-Sheet 2
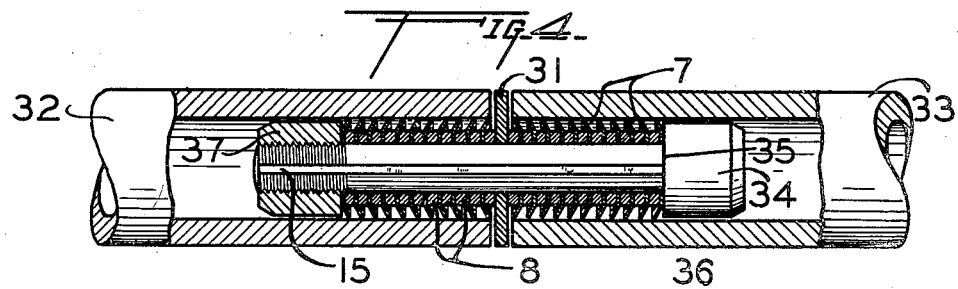
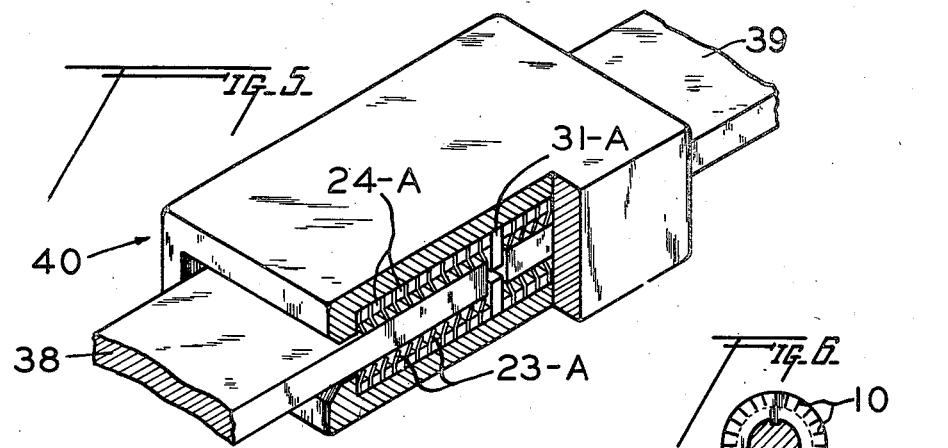
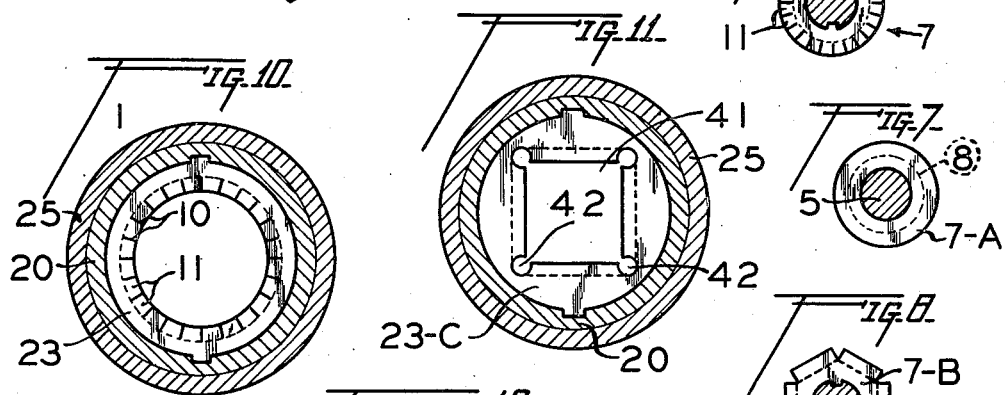
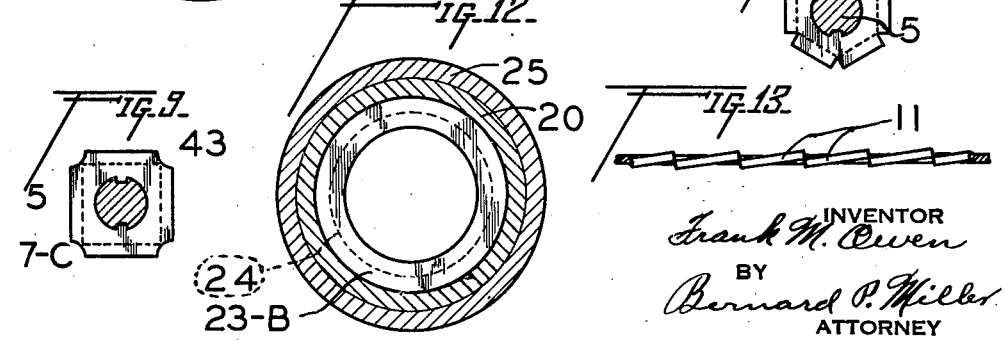

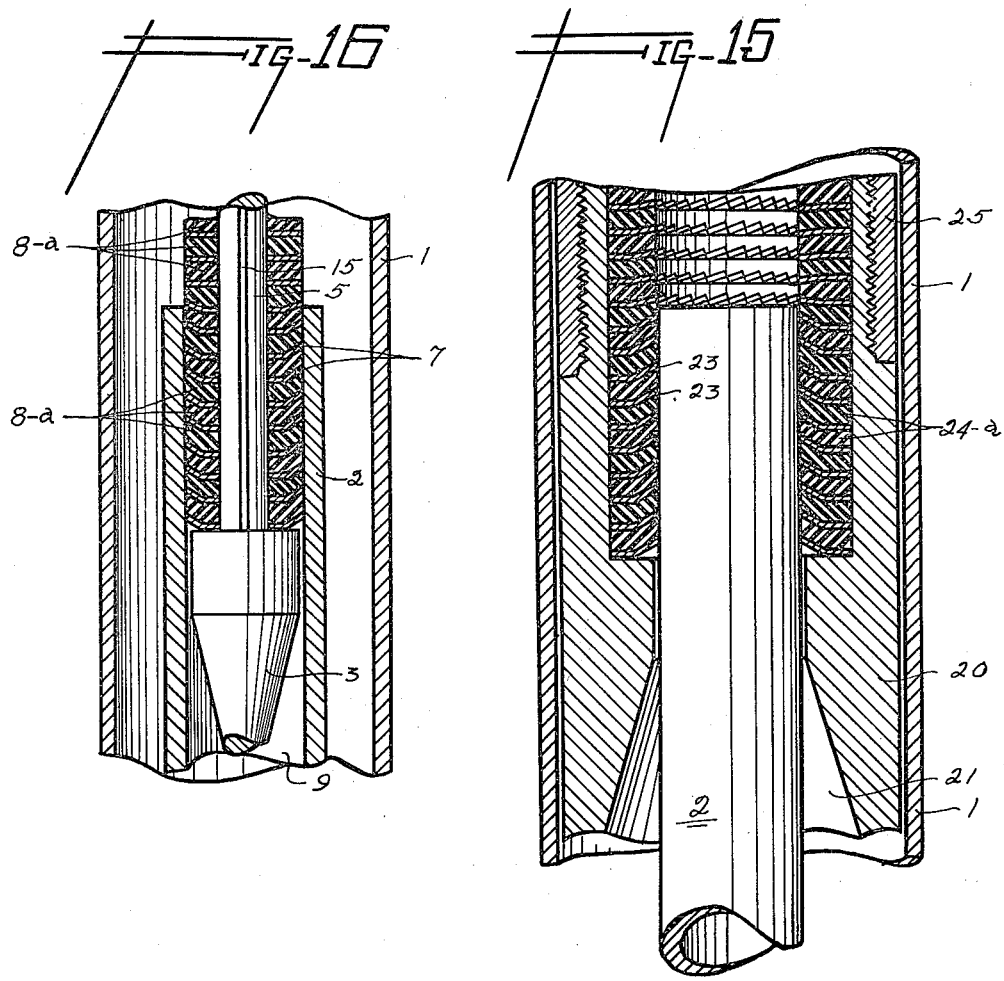

Patented Dec. 2, 1941

2,264,480

UNITED STATES PATENT OFFICE 2,264,480

GRIPPING DEVICE

Frank M. Owen, Oklahoma City, Okla.

Application February 28, 1938, Serial No. 193,025

8 Claims. (Cl. 294—93)

The invention relates to mechanical means for positively gripping various elements.

The invention consists substantially of the provision, in various embodiments for numerous purposes, of mechanical gripping mechanism utilizing one general principal, viz: a flexible metal disc or washer slightly distortable by contact with the element to be gripped.

In the embodiments hereinbelow described a few of the various forms of utilizing this principle are explained in construction and function, but obviously other embodiments could well be conceived and put into practical use without departing from the general principle involved.

The invention in its most general mechanical form consists of a series of spaced superposed flexible discs of some suitable material preferably spring steel, and means for retaining the discs and their spacers in their alined positions.

The prime object of the invention is to provide a simple gripping means which will be positive in action, compact and economical to manufacture.

Another object is the provision of a fishing tool adapted to pack-off with the "fish" whereby circulation of a fluid may be accomplished to assist in washing the "fish" free from entanglements.

Other objects of the invention are the provision of such a device having universal utility; which may be designed to grip either the inside or outside of one or more elements; which may be designed to grip such element or elements having various cross-sectional configuration and bores; which will be durable; and, which will be efficient in accomplishing all of the purposes for which it is intended.

In the drawings:

Figure 1 is an elevational sectional view of a tool embodying the invention, and commonly known in oil well drilling as a "spear";

Figure 2 is a similar view of a tool known in oil well drilling as an "overshot";

Figure 3 is a similar view of the invention designed as an outside coupling for two aligned cylindrical elements such as shafts or tubing sections;

Figure 4 is a similar view of the invention designed as an inside coupling for two abutting tubular elements;

Figure 5 is a fragmentary perspective view of the invention designed for coupling two abutting elements of angular cross-section;

Figure 6 is a typical section taken substantially along the line A—A of Fig. 1;

Figure 7 is a similar view along the same line but disclosing a disc of slightly different construction;

Figure 8 is a similar view disclosing a disc for gripping a hollow element having a hexagonal bore;

Figure 9 is a similar view disclosing a disc for gripping a hollow element having a square bore;

Figure 10 is a typical sectional view taken substantially along the line B—B of Fig. 2;

Figure 11 is a similar view disclosing a disc for gripping the exterior of an element which is square in cross-section;

Figure 12 is a similar view showing a solid disc for use in place of the discs of Fig. 2;

Figure 13 is a fragmentary elevational view showing the deformations carried by the discs in their preferred embodiment, and which may be carried by either the inside or outside edge portions thereof;

Figure 14 is a fragmentary sectional view showing two elements held together by discs of the invention;

Figure 15 is a fragmentary sectional view showing an embodiment of the invention in the form of an "overshot," and including a pack-off structure; and, Figure 16 is a similar view of a "spear."

Like characters of reference designate like parts in all of the figures.

Refer now more particularly to Fig. 1 in which the invention is embodied in the form of an oil field fishing tool commonly known as a "spear," and wherein the reference numeral indicates a well casing within which is shown the upper end portion 2 of a tubular element which, for purpose of description, may be considered to be the upper end of a section of drill stem or tubing which has been broken off in the well, below the earth's surface.

As a means for engaging the element 2 or "fish" in order that it may be withdrawn from the well, the following mechanism is provided. A spear head 3, conical in form is equipped with an abrupt shoulder 4 and an axial, upstanding, reduced projection 5 thereabove which has threads 6 around its upper end portion. Fitting snugly around the projection 5 are a plurality of alternate discs 7 (Fig. 6) and spacers 8 which are stacked one upon the other. The spacers 8 are preferably made of any suitable substance such as soft steel, and the discs 7 are preferably made of sheet spring steel, and are of an outside diameter slightly larger than the bore 9 of the "fish" 2. Each of the discs 7 is, in its most usual form, provided with a plurality of radiating slits 10 spaced radially around the periphery of the disc (Fig. 6). As may best be seen in Fig. 13 the teeth or the portions 11 of the disc lying between the slits 10, are bent slightly at an angle with relation to each other, and similar edge faces of each are pointed at similar angles with relation to the plane of the body of the disc.

The threads 6 of the projection 5 receive an interiorly threaded body 12 which when tightened down compresses the discs 7 and spacers 8 against the shoulder 4 and hold them rigidly in place. The upper end of the body 12 is equipped with an exteriorly threaded pin 13 for connecting the lower end of a string of drill pipe or other means whereby the tool may be lowered into the well for engaging the "fish."

In fishing for a "fish" such as the element 2 for instance, it is possible to ascertain from the recovered portion thereof, the approximate diameter of the bore 9. Consequently, the tool used for the particular job will be constructed with the outside diameter of its discs 7 slightly greater than the inside diameter of the "fish." When the head 3 is forced downwardly into the bore 9 by weight thereabove, the teeth 11 of the discs 7 are bent slightly in an upward direction due to their contact with the walls of the "fish." Very little weight is required to accomplish the upward bending of the teeth due to the fact that the discs are held apart by the spacers and consequently only one disc is distorted at a time. The lower end 14 of the body 12 acts as a stop when in contact with the upper end of the "fish."

After insertion of the tool in the "fish," upward movement thereof causes the toothed peripheries of the discs 7 to frictionally engage the walls of the "fish," and, since there is insufficient space between the walls and the projection 5 for the teeth to buckle and turn downwardly, the "fish" must necessarily move upwardly with the tool.

After engagement of the tool with the "fish," should it be found that the "fish" is so tightly caught in the well that it is impossible to pull it loose, it would then become necessary to release the tool from the "fish." This is accomplished as follows:

Since the teeth 11 all have their similar edges disposed at similar angles with relation to the plane of the bodies of the discs (Fig. 13), when the tool is rotated in a direction in which the upwardly pointed edges of the teeth 11 are the leading edges, the teeth act against the walls of the "fish" the same as if the tool had been threaded thereinto, and the tool therefore is merely unscrewed from the "fish."

As a means for insuring rotation of the discs 7 with the tool, the discs may be splined to the projection 5. In Figure 1, the reference numeral 15 may represent either a longitudinally extending rib or a groove for accomplishing the desired connection. As may be seen in Fig. 6, this embodiment depicts 15 as being a groove.

If desired, the body 12, projection 5 and head 3 may be provided with longitudinal passages whereby circulation may be had from above to the interior of the "fish"; also, the spacers 8 may all or some of them be constructed of rubber whereby they will pack off between the wall of the "fish" and the projection 5.

In Fig. 2 is illustrated the invention embodied in the form of a fishing tool known in oil field parlance as an "overshot." This tool consists substantially of an axially bored body 20 the lower portion 21 of the bore of which is enlarged and tapers downwardly and outwardly, an abrupt annular shoulder 22 being formed above the upper end of the enlargement 21. A plurality of discs 23 and spacers 24 are alternately superposed upon each other and are supported by the shoulder 22. A head 25 is threaded upon the upper end of the body 20 and when tightened down impinges the discs and spacers against the shoulder 22 holding them rigidly in place and the upper end of the head 25 carries threaded pin 13. As best seen in Fig. 10, the discs of this embodiment are provided with the slits 10 radially spaced around their inner edges whereby the teeth 11 thus formed may engage the exterior of the "fish" 2. As previously described with reference to Fig. 1, the teeth 11 of the present embodiment are also bent at an angle with relation to the plane of the disc bodies in the manner illustrated in Fig. 13, and this tool is also released from the "fish" by rotation as previously described. The discs 23 may also be splined to the body 20 as were the discs 7 of Fig. 1 (Fig. 10). It is thought operation of the present embodiment will be obvious.

In Fig. 3 the invention is shown embodied in the form of an outside coupling for two alined pipes or shafts 26 and 27. In this embodiment, the discs 23 and spacers 24 are confined in a bowl formed of two hollow threadedly connected body sections 28 and 29. The opposite ends of these sections are open and are equipped with outwardly tapered or flared orifices 30 for expediting insertion of the elements 26 and 27. An annular dividing ring 31 is provided for receiving the adjacent ends of the elements, and this ring may be made of metal, or if desired can be formed of rubber so that a fluid tight joint may be had when fluid carrying elements are to be coupled together.

In Fig. 4 an inside coupling is disclosed for engaging two tubular elements or pipes 32 and 33. In this embodiment the coupling consists substantially of a body 34 having an annular shoulder 35, a smaller projection 36 for receiving the discs 7 and spacers 8, and a threaded cap 37 threaded upon the end of the projection for firmly retaining the discs and spacers. A dividing ring 31 is provided around the projection between the adjacent ends of the elements 32 and 33.

In the embodiments illustrated in Figs. 3 and 4, the elements are coupled together by merely forcing them into the bowl, or over the tool, as the case may be, and in both instances, may be uncoupled by rotation of the elements in opposite directions.

In Fig. 5 is illustrated a tool somewhat similar to the coupling of Fig. 3, but designed to engage the outside of two alined elements 38 and 39 which are angular in cross-section. In this embodiment deformable gripping elements 23—A and spacers 24—A are provided in lieu of the discs 23 and spacers 24 of Fig. 3. The gripping elements and spacers are rectangular and fit snugly within a metal housing or box 40 which is open at both ends to receive the elements 38 and 39.

The box of Fig. 5 is shown with a solid body, and when so formed, no means is provided for releasing the elements 38 and 39. However, it is contemplated to form the box in two halves longitudinally hinged together so that the elements may be released at will. In this case suitable latching means would be furnished, and the gripping elements 23—A and the spacers 24—A would also be made in section. A divider 31—A is located between the adjacent ends of the elements. This tool can readily be designed with only one end open to receive, for instance the element 39, and when rigidly attached to a work bench or similar support, may be used for a quick acting vise or chuck for retaining a piece upon which work is to be done.

It may be found for some purposes that there is no occasion for releasing the various tools from the element or elements with which they have been previously engaged. In this event, the "spear" type tools, or those operating inside of the "fish," may be equipped with solid discs 7—A of the type shown in Fig. 7 in which the slits 10 have been eliminated, and tools of the "overshot" type may have solid discs 23—B as shown in Fig. 12.

In Fig. 8 is shown a disc or gripping element 7—B which may be used in lieu of the discs 7 should it be desirable to engage a hollow element having a hexagonal bore, and in Fig. 9 is shown a gripping element 7—C which may be similarly used in engaging a hollow element with a square bore.

Similarly, in Fig. 11 is illustrated a gripping element or disc 23—C having a square orifice 41 which may be embodied in an "overshot" for engaging a square "fish" such as a drill "kelley." It will be noted that at each corner of the orifice 41, the disc is relieved by notches 42 so that the disc may bend slightly when engaging the "fish." This principle is also carried out in the corners of the disc 7—C (Fig. 9) by the provision of notches 43.

In Fig. 14 is shown a manner, in accordance with the invention, of attaching two elements 50 and 51 together upon a rod, bolt or similar member 52. In this instance, the bolt is passed through the elements and then receives at each end one or more of the discs 23 which are pressed tightly against the outer faces of the elements.

In Fig. 15 is shown an embodiment of the invention wherein an "overshot" similar to the embodiment illustrated in Fig. 2 is equipped with means for packing off between the "fish" 2 and the inner wall of the body 20. In this embodiment, the usual spacers 24, as shown in Fig. 2, are supplanted by annular sealing elements 24—a of resilient material such as rubber or the like.

In using this embodiment, the "fish" 2 entering the body 20 causes the inner edges of the elements 24—a to be sprung upwardly as shown. The sealing elements 24—a are of a sufficient width between their outer and inner edges to span the distance between the "fish" and the body 20, and consequently, any fluid pressure exerted downwardly within the body 20 will be forced by the sealing elements to flow through the "fish."

In Fig. 16 is shown an embodiment of the invention in the form of a "spear," which is equipped with a sealing means similar in office to that of Fig. 15. In this embodiment, which is similar in form to that of Fig. 1, the spacers 8 have been supplanted by resilient annular spacers 8—a. The operation of this embodiment is similar to that of Fig. 15 except that the elements 8—a seal with the inner wall of the "fish" 2.

From the foregoing description, it may be readily seen that although a number of mechanisms have been disclosed, they all utilize the same general principle of frictional grip by one or more resilient deformable sheet gripping elements. Of course, the amount of required resiliency and distortion will vary according to the particular job to be accomplished. It may also be seen that since the gripping elements may be formed by a single die stamping operation, economy in manufacture is attained, and in each embodiment, the gripping elements may readily be replaced if broken.

I claim:

1. A gripping mechanism comprising a plurality of aligned resilient metal washers, the interior edge of each washer being provided with radial teeth which are distorted at an angle from the plane of the body of the washer whereby the device may be unscrewed from a gripped object by rotation, annular spacers for the washers, a housing for the washers and spacers, and adjustable means for compressing the washers and spacers together within the housing.

2. A gripping mechanism for the interior of tubular elements, comprising a plurality of aligned resilient metal washers, the outer edge of each washer being provided with radial teeth which are distorted at an angle from the plane of the body of the washer whereby the device may be unscrewed from a gripped object by rotation, annular spacers for the washers, a rod passing through the washers and spacers, and means for rigidly clamping the inner edge portions of the elements and spacers together.

3. Organization as described in claim 1, in which the spacers are formed of a compressible material and are adapted to pack off between the rod and the tubular element.

4. A fishing tool comprising the combination with a body including rings of elastic non-metallic material, and metallic members constituting part of said body and exposed through the wall surfaces thereof, said members being spaced longitudinally of said body by said rings, and teeth carried by the exposed portions of the members, said teeth being disposed at an obtuse angle with relation to the axis of the body whereby the body may be unscrewed from an engaged object passing therethrough, and means for holding the rings and the metallic members in superimposed relation.

5. A fishing tool comprising the combination with a body including rings of elastic nonmetallic material, and annular metallic members constituting part of said body and exposed through the inner wall surfaces thereof, said members being spaced longitudinally of said body by said rings, and teeth carried by the exposed portions of the members, said teeth being disposed at an obtuse angle with relation to the axis of the body whereby the body may be unscrewed from an engaged object passing therethrough, and means for holding the rings and the metallic members in superimposed relation.

6. A fishing tool comprising the combination with a body including rings of elastic nonmetallic material, and metallic members exposed through the surface of said body between said rings, teeth carried by the exposed portions of said members, said teeth disposed at an obtuse angle with relation to the axis of the body whereby the body may be unscrewed from an engaged object, and means for holding the rings and the metallic members in superimposed relation.

7. A fishing tool comprising the combination with a body including rings of elastic nonmetallic material, and metallic members exposed through the outer surface of said body between said rings, teeth carried by the exposed portions of said members, said teeth disposed at an obtuse angle with relation to the axis of the body whereby the body may be unscrewed from an engaged object surrounding the body, and means for holding the rings and the metallic members in superimposed relation.

8. A fishing tool comprising the combination with a body including rings, and metallic members constituting part of said body and exposed through the wall surfaces thereof, said members being spaced longitudinally of said body by said rings, and teeth carried by the exposed portions of the members, said teeth being disposed at an obtuse angle with relation to the axis of the body whereby the body may be unscrewed from an engaged object, and means for holding the rings and the metallic members in superimposed relation.

FRANK M. OWEN.